US011215468B2

(12) United States Patent
Sugimura et al.

(10) Patent No.: US 11,215,468 B2
(45) Date of Patent: Jan. 4, 2022

(54) INFORMATION PROCESSING APPARATUS, VEHICLE, AND STORAGE MEDIUM STORING PROGRAM

(71) Applicant: TOYOTA JIDOSHA KABUSHIKI KAISHA, Toyota (JP)

(72) Inventors: Tae Sugimura, Miyoshi (JP); Hirotaka Karube, Toyota (JP); Kazuki Matsumoto, Ohgaki (JP); Makoto Mori, Nagakute (JP); Jun Kondo, Nissin (JP)

(73) Assignee: TOYOTA JIDOSHA KABUSHIKI KAISHA, Toyota (JP)

(*) Notice: Subject to any disclaimer, the term of this patent is extended or adjusted under 35 U.S.C. 154(b) by 412 days.

(21) Appl. No.: 16/512,625

(22) Filed: Jul. 16, 2019

(65) Prior Publication Data
US 2020/0116512 A1 Apr. 16, 2020

(30) Foreign Application Priority Data
Oct. 10, 2018 (JP) .............................. JP2018-191942

(51) Int. Cl.
G01C 21/34 (2006.01)
G08B 25/01 (2006.01)
G08B 21/10 (2006.01)
H04W 4/90 (2018.01)
H04W 4/44 (2018.01)
G08G 1/127 (2006.01)

(52) U.S. Cl.
CPC ..... G01C 21/3453 (2013.01); G01C 21/3407 (2013.01); G08B 21/10 (2013.01); G08B 25/016 (2013.01); G08G 1/127 (2013.01); H04W 4/44 (2018.02); H04W 4/90 (2018.02)

(58) Field of Classification Search
CPC ............ G01C 21/3407; G01C 21/3453; G01C 21/3617; G01C 21/362; G08B 21/10; G08B 25/016; G08B 7/066; G08G 1/127; G08G 1/205; H04W 4/02; H04W 4/44; H04W 4/90
See application file for complete search history.

(56) References Cited

FOREIGN PATENT DOCUMENTS

| JP | 2010-211430 A | 9/2010 |
|---|---|---|
| JP | 2012-042361 A | 3/2012 |
| JP | 2013-008184 A | 1/2013 |
| JP | 2016-017826 A | 2/2016 |

Primary Examiner — Thomas S McCormack
(74) Attorney, Agent, or Firm — Oliff PLC

(57) ABSTRACT

An information processing apparatus includes a registration unit that receives registration of personal information including at least one of an age, an address, a family structure, and a physical feature of a user, a priority management unit that, based on the registered personal information, stores a specific user set with priority for a person to be rescued at the time of disaster occurrence, a disaster information acquisition unit that acquires information regarding occurrence of a disaster in a predetermined area, a positional information acquisition unit that acquires current positional information of an autonomous driving vehicle, a traveling route decision unit that, when the disaster information acquisition unit acquires the information of the disaster, decides a traveling route to a position of the specific user, and an output unit that outputs a signal for executing an autonomous driving mode based on information indicating the traveling route.

7 Claims, 13 Drawing Sheets

FIG. 3A

USER DB

| USER ID | NAME | SEX | AGE | HOME | PRESENCE OF ABSENCE OF DISORDER OR CHRONIC DISEASE | CONTENT OF DISORDER OR CHRONIC DISEASE | DISASTER RISK AROUND HOME | VARIOUS KINDS OF INFORMATION |
|---|---|---|---|---|---|---|---|---|
| U01 | XX | MALE | 15 | ·· G-KU, TOKYO | ABSENT | - | LANDSLIDE | FATHER, MOTHER ·· |
| U02 | YY | MALE | 70 | ·· H-KU, TOKYO | ABSENT | - | FLOOD | ... |
| U03 | ZZ | FEMALE | 40 | ·· S-KU, TOKYO | ABSENT | - | ABSENT | ... |
| U04 | KK | MALE | 25 | ·· P-KU, TOKYO | PRESENT | UPPER LIMB FUNCTION DISORDER | ABSENT | ... |
| U05 | FF | FEMALE | 80 | ·· R-KU, TOKYO | PRESENT | RESPIRATORY FUNCTION DISORDER | ABSENT | ... |
| ... | ... | ... | ... | ... | ... | ... | ... | ... |

FIG. 3B

PRIORITY MANAGEMENT DB

| USER ID | PRIORITY | PRIORITY CHANGE CONDITION |
|---|---|---|
| U01 | E | CHANGE TO PRIORITY A IN CASE WHERE LANDSLIDE DISASTER WARNING IS ISSUED IN G-KU, TOKYO |
| U02 | B | CHANGE TO PRIORITY A IN CASE WHERE HEAVY RAIN AND FLOOD WARNING IS ISSUED IN H-KU, TOKYO |
| U03 | D | ABSENT |
| U04 | B | ABSENT |
| U05 | A | ABSENT |
| ... | ... | ... |

FIG. 4A

DISASTER INFORMATION DB

| AREA | TIME | CONTENT OF DISASTER | LEVEL OF DISASTER |
|---|---|---|---|
| ·· TOKYO | JANUARY 10 | RAIN | 1 |
| ·· AICHI-KEN | JANUARY 9 | HEAVY RAIN, FLOOD | 3 |
| ·· FUKUOKA-KEN | JANUARY 8 | STORM | 2 |
| ·· SHIZUOKA-KEN | JANUARY 9 | EARTHQUAKE, TSUNAMI | 5 |
| ... | ... | ... | ... |

FIG. 4B

VEHICLE INFORMATION DB

| VEHICLE ID | VEHICLE TYPE | CAPACITY | CURRENT POSITION | VARIOUS KINDS OF INFORMATION (DISTANCE FROM SPECIFIC USER) |
|---|---|---|---|---|
| M01 | XXX | 1 | ·· G-KU, TOKYO | 200 m |
| M02 | YYY | 2 | ·· H-KU, TOKYO | 500 m |
| M03 | XXX | 1 | ·· S-KU, TOKYO | 1 km |
| M04 | ZZZ | 1 | ·· P-KU, TOKYO | 300 m |
| ... | ... | ... | ... | ... |

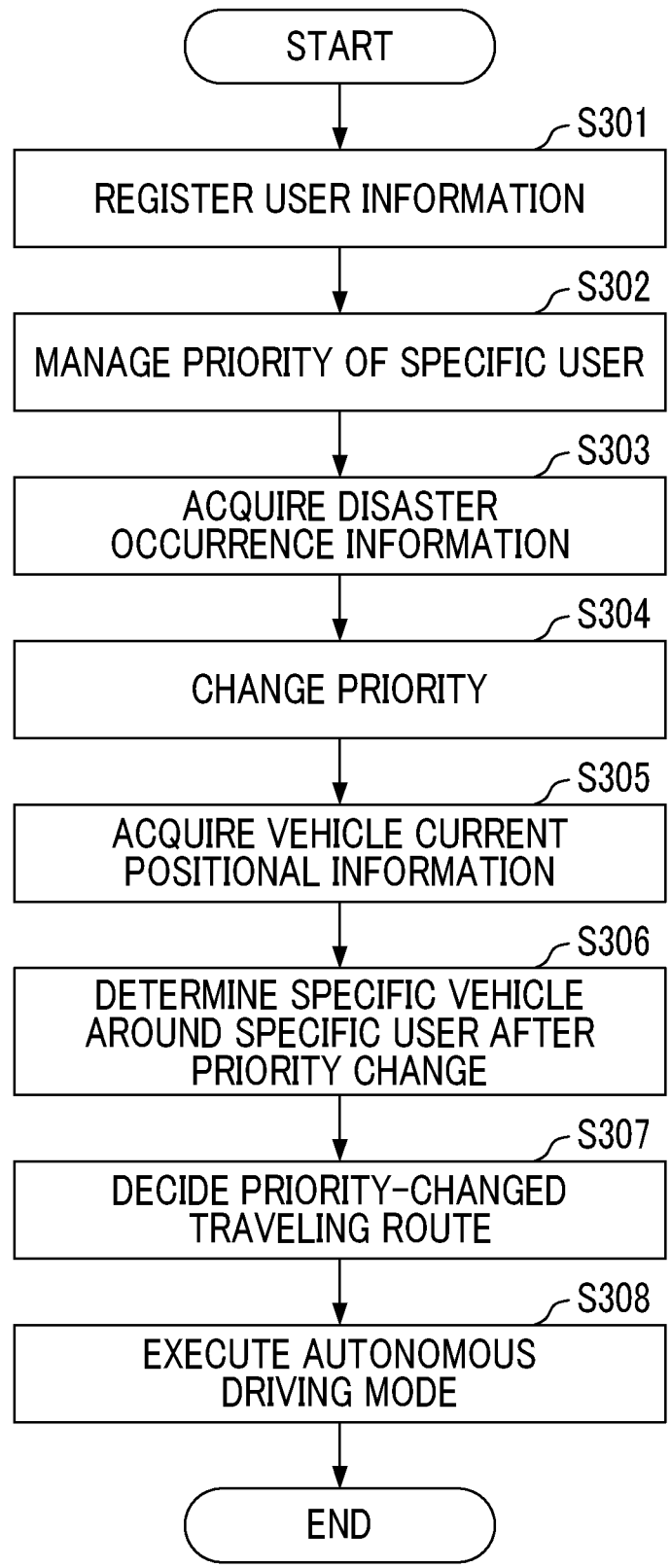

INFORMATION PROCESSING APPARATUS, VEHICLE, AND STORAGE MEDIUM STORING PROGRAM

INCORPORATION BY REFERENCE

The disclosure of Japanese Patent Application No. 2018-191942 filed on Oct. 10, 2018 including the specification, drawings and abstract is incorporated herein by reference in its entirety.

BACKGROUND

1. Technical Field

The present disclosure relates to an information processing apparatus, a vehicle, and a storage medium storing a program.

2. Description of Related Art

In a case where a disaster, such as an earthquake or a typhoon, occurs, prompt rescue and evacuation support are demanded. Various techniques have been hitherto suggested in order to efficiently perform rescue and evacuation support.

For example, in Japanese Unexamined Patent Application Publication No. 2010-211430 (JP 2010-211430 A), evacuation support is performed after not only performing determination about whether or not a person to be rescued is present in a dangerous area, but also attaching a rescue request level of a person to be rescued indicating a person who basically needs evacuation support, a person who can basically evacuate by himself or herself, or a person who can evacuate by himself or herself but needs evacuation support according to situations. According to JP 2010-211430 A, information regarding the level in need of rescue is attached for each person to be rescued, and evacuation support is performed based on the attached information, whereby it is possible to efficiently support evacuation of the person to be rescued.

SUMMARY

On the other hand, when a person (a person who performs rescue) goes toward a disaster site after a disaster occurs, since there is a need to appropriately ascertain a location of a person to be rescued in addition to ascertaining a place where the disaster actually occurs, a lot of time is usually needed until the person arrives. As in JP 2010-211430 A, the rescue request level is attached for each person to be rescued, the number of persons who need rescue is reduced and the reduced number of persons is searched, whereby it is possible to reduce the time to some extent. However, the problem of performing efficient evacuation support remains.

The disclosure provides an information processing apparatus, a vehicle, and a storage medium storing a program capable of eliminating a need of searching for a person to be rescued when a disaster occurs and performing efficient evacuation support.

A first aspect of the disclosure relates to an information processing apparatus. The information processing apparatus includes a registration unit, a priority management unit, a disaster information acquisition unit, a positional information acquisition unit, a traveling route decision unit, and an output unit. The registration unit is configured to receive registration of personal information including at least one of an age, an address, a family structure, and a physical feature of a user. The priority management unit is configured to, based on the registered personal information, store a specific user set with priority for a person to be rescued at the time of disaster occurrence. The disaster information acquisition unit is configured to acquire information regarding occurrence of a disaster in a predetermined area. The positional information acquisition unit is configured to acquire current positional information of an autonomous driving vehicle. The traveling route decision unit configured to, when the disaster information acquisition unit acquires the information regarding occurrence of the disaster, decide a traveling route from the current position of the autonomous driving vehicle to a position of the specific user. The output unit is configured to output a signal for executing an autonomous driving mode based on information indicating the traveling route decided by the traveling route decision unit.

In the information processing apparatus according to the first aspect, the registration unit may be configured to further receive registration of information relating to disaster risk around the address of the user. When the information regarding occurrence of the disaster acquired by the disaster information acquisition unit is information corresponding to the disaster risk, the output unit is configured to output the signal for executing the autonomous driving mode to the user positioned around the address.

In the information processing apparatus according to the first aspect, the priority management unit may be configured to raise priority for a person weak in disaster who needs evacuation guidance support at the time of the disaster occurrence and store the person weak in disaster set with the raised priority. When the disaster information acquisition unit acquires the information regarding occurrence of the disaster, the traveling route decision unit is configured to further decide a priority traveling route from the current position of the autonomous driving vehicle to a position of the person weak in disaster in the traveling route. The output unit may be configured to output the signal for executing the autonomous driving mode based on information indicating the priority traveling route.

The information processing apparatus according to the first aspect may further include a determination unit configured to determine a specific vehicle positioned around the specific user among autonomous driving vehicles, the information regarding the current position of which is acquired by the positional information acquisition unit. The traveling route decision unit may be configured to further decide a specific traveling route from a current position of the specific vehicle to the position of the specific user. The output unit may be configured to output the signal for executing the autonomous driving mode based on information indicating the specific traveling route.

In the information processing apparatus according to the first aspect, the priority management unit may be configured to store first priority as the priority set for each user based on the personal information and second priority as the priority changed to be higher than the first priority for a user who is located in a risk section to be predicted according to a content of the disaster acquired by the disaster information acquisition unit. The traveling route decision unit may be configured to further decide priority-changed traveling route from the current position of the autonomous driving vehicle to a position of the user set with the second priority. The output unit may be configured to output the signal for executing the autonomous driving mode based on information indicating the priority-changed traveling route.

A second aspect of the disclosure relates to a vehicle mounted with the information processing apparatus.

A third aspect of the disclosure relates to a storage medium storing a program. The program causes a computer to execute registering personal information including at least one of an age, an address, a family structure, and a physical feature of a user, based on the registered personal information, storing a specific user set with priority for a person to be rescued at the time of disaster occurrence, acquiring information regarding occurrence of a disaster in a predetermined area, acquiring information regarding current position of an autonomous driving vehicle, when the information regarding occurrence of the disaster is acquired, deciding a traveling route from the current position of the autonomous driving vehicle to a position of the specific user, and outputting a signal for executing an autonomous driving mode based on information indicating the traveling route.

According to the aspects of the disclosure, it is possible to provide an information processing apparatus, a vehicle, and a storage medium storing a program capable of eliminating a need of searching for a person to be rescued when a disaster occurs and performing efficient evacuation support.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 3A is a diagram showing a specific example of a user DB;

FIG. 3B is a diagram showing a specific example of a priority management DB;

FIG. 4A is a diagram showing a specific example of a disaster information DB;

FIG. 4B is a diagram showing a specific example of a vehicle information DB;

FIG. 13 is a flowchart showing a second modification example of the control processing that is executed by the information processing apparatus.

DETAILED DESCRIPTION OF EMBODIMENTS

Figure 1:
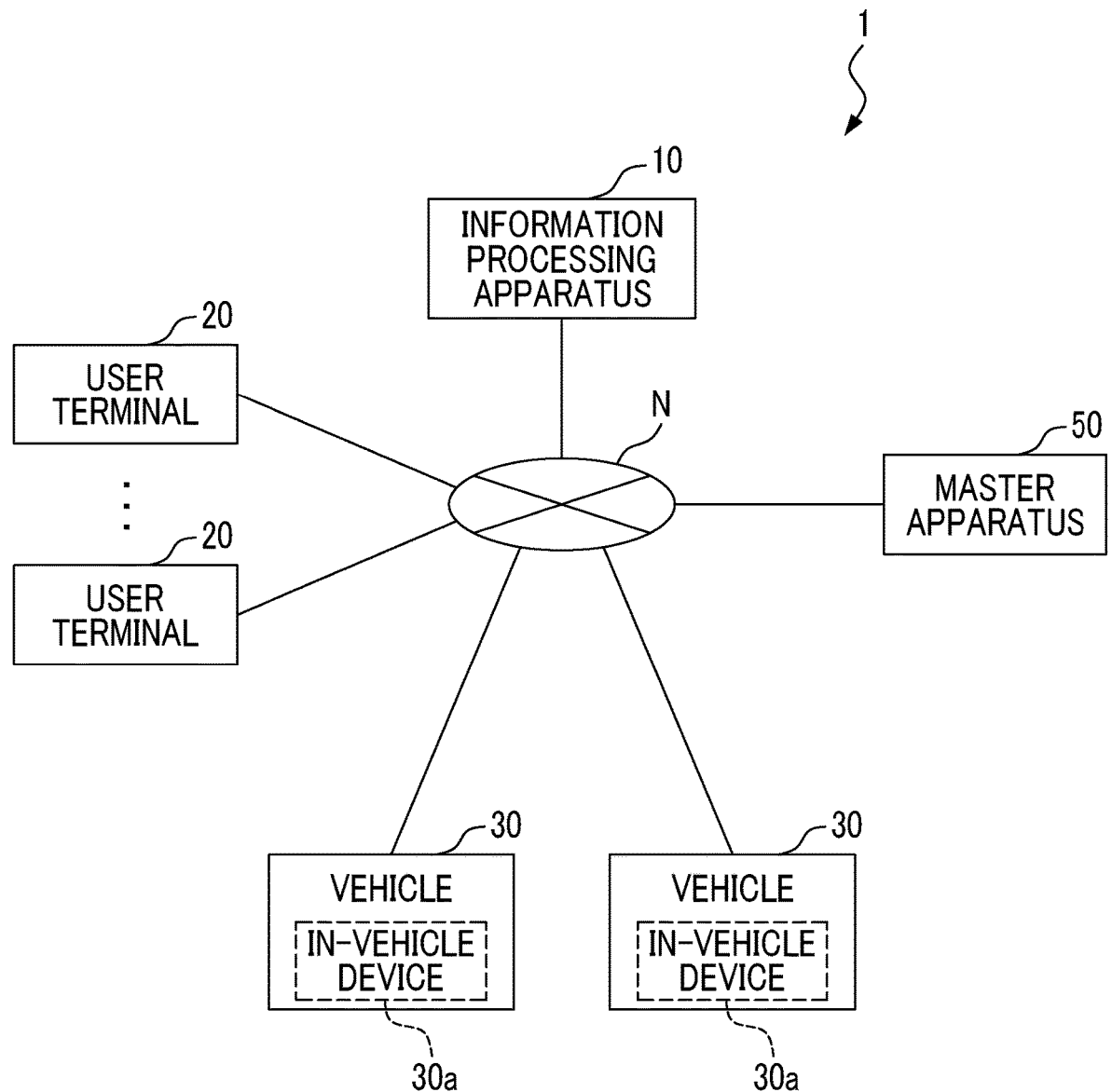
FIG. 1 is a diagram showing a configuration example of an information processing system.

A preferred embodiment will be described referring to the accompanying drawings. In the drawings, elements having the same reference numerals have the same or similar configurations.

System Configuration

FIG. 1 is a diagram showing a configuration example of an information processing system including an information processing apparatus according to the embodiment.

An information processing system 1 includes an information processing apparatus 10, user terminals 20, vehicles 30, and a master apparatus 50. The information processing apparatus 10, the user terminals 20, in-vehicle devices 30a mounted in the vehicles 30, and the master apparatus 50 can perform communication with one another through a communication network N.

In the following description, although an example where a system in which the vehicles 30 and the information processing apparatus 10 perform communication with each other through the communication network N, and are constituted separately is implemented will be described, the disclosure is not limited to the example. For example, the disclosure can also be implemented as a so-called standalone apparatus with the single vehicle 30 mounted with the information processing apparatus 10 having a function of processing or outputting information recorded in a recording medium, or the like.

The master apparatus 50 is an apparatus that transmits an emergency signal generated when a disaster occurs. For example, the master apparatus 50 predicts occurrence of an earthquake or a tsunami based on information obtained from a sensor, such as a seismograph, and transmits the emergency signal in a case where occurrence of severe damage is predicted.

Each of the user terminals 20 is a terminal that is used by a user, and is, for example, a smartphone, a tablet terminal, a portable terminal, a notebook personal computer, or the like. The user accesses the information processing apparatus 10 using the user terminal 20, and can register personal information and the like (age, address, family structure, physical feature, disaster risk around home, and the like) of the user in the information processing apparatus 10.

The information processing apparatus 10 receives the registration of the personal information and the like input from the user and manages the personal information and the like in a database. Furthermore, the information processing apparatus 10 receives disaster information from the master apparatus 50 and outputs predetermined information to the in-vehicle device 30a of the vehicle 30.

The vehicle 30 mounted with the in-vehicle device 30a moves to a place where the user is located in response to a command from the information processing apparatus 10 when a disaster occurs. In a case where the vehicle 30 is a manual driving vehicle, the in-vehicle device 30a may be a device (for example, a navigation device) that can display a traveling route to a destination output from the information processing apparatus 10. In a case where the vehicle 30 is an autonomous driving vehicle, the in-vehicle device 30a performs various kinds of control for autonomously driving the vehicle 30 along the traveling route to the destination transmitted from the information processing apparatus 10.

In the embodiment, as the vehicle 30, for example, an electrified ultra-compact mobility that is more compact and has a smaller turning circle than a standard automobile is used. The configuration of the ultra-compact mobility will be described below.

Figure 2A:
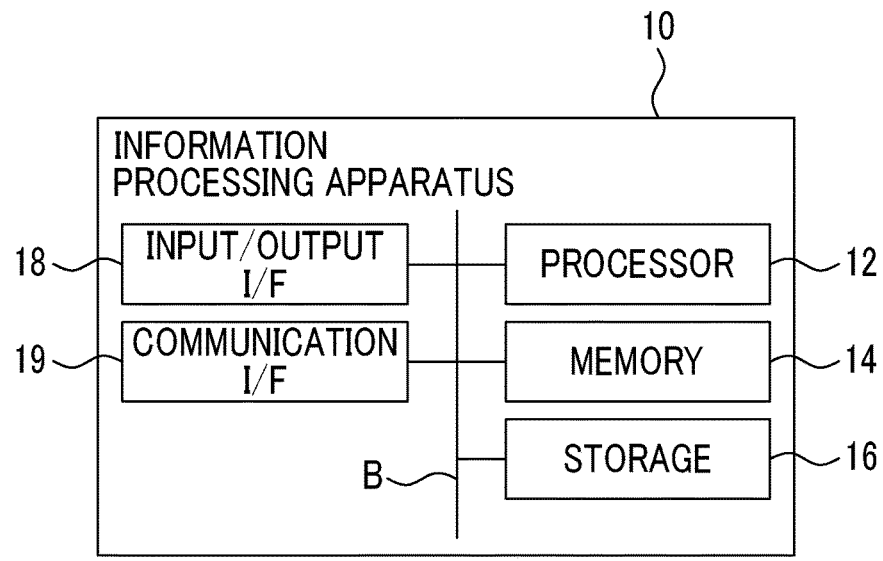
FIG. 2A is a diagram showing an example of the hardware configuration of an information processing apparatus.

Subsequently, the configuration of the information processing apparatus 10 will be described. FIG. 2A is a diagram showing an example of the hardware configuration of the information processing apparatus 10. The information processing apparatus 10 includes a processor 12, a memory 14, a storage 16, an input/output interface (input/output I/F) 18, and a communication interface (communication I/F) 19. The constituent elements of hardware (HW) of the information processing apparatus 10 are connected to one another, for example, through a bus B.

The information processing apparatus 10 implements at least one of functions or methods described in the embodiment in cooperation with the processor 12, the memory 14, the storage 16, the input/output I/F 18, and the communication I/F 19.

The processor 12 executes at least one of functions or methods that are implemented with codes or commands included in a program stored in the storage 16. The processor 12 includes, for example, a central processing unit (CPU), a micro processing unit (MPU), a graphics processing unit (GPU), a microprocessor, a processor core, a multiprocessor, an application-specific integrated circuit (ASIC), a field programmable gate array (FPGA), or the like.

The memory 14 temporarily stores a program loaded from the storage 16 and provides a work area to the processor 12. In the memory 14, various pieces of data that are generated while the processor 12 is executing the program are temporarily stored. The memory 14 includes, for example, a random access memory (RAM), a read only memory (ROM), or the like.

The storage 16 stores the program that is executed by the processor 12, and the like. The storage 16 includes, for example, a hard disk drive (HDD), a solid state drive (SSD), a flash memory, or the like.

The input/output I/F 18 includes an input device that is provided to input various operations to the information processing apparatus 10, and an output device that is provided to output a processing result processed by the information processing apparatus 10.

The communication I/F 19 performs transmission and reception of various pieces of data through a network. The communication may be performed in a wired or wireless manner, and any communication protocol may be used as long as mutual communication can be performed. The communication I/F 19 has a function of performing communication with the vehicle 30 through the network. The communication I/F 19 transmits various pieces of data to another information processing apparatus or the vehicle 30 in response to an instruction from the processor 12.

The program of the embodiment may be provided in a state of being stored in a computer-readable storage medium. The storage medium can store the program in a "non-transitory tangible medium". The program includes, for example, a software program or a computer program.

At least a part of processing in the information processing apparatus 10 may be implemented with cloud computing constituted of one or more computers. At least a part of the processing in the information processing apparatus 10 may be executed by another information processing apparatus. In this case, at least a part of processing of respective functional units to be implemented with the processor 12 may be executed by another information processing apparatus.

Functional Block Configuration

Figure 2B:
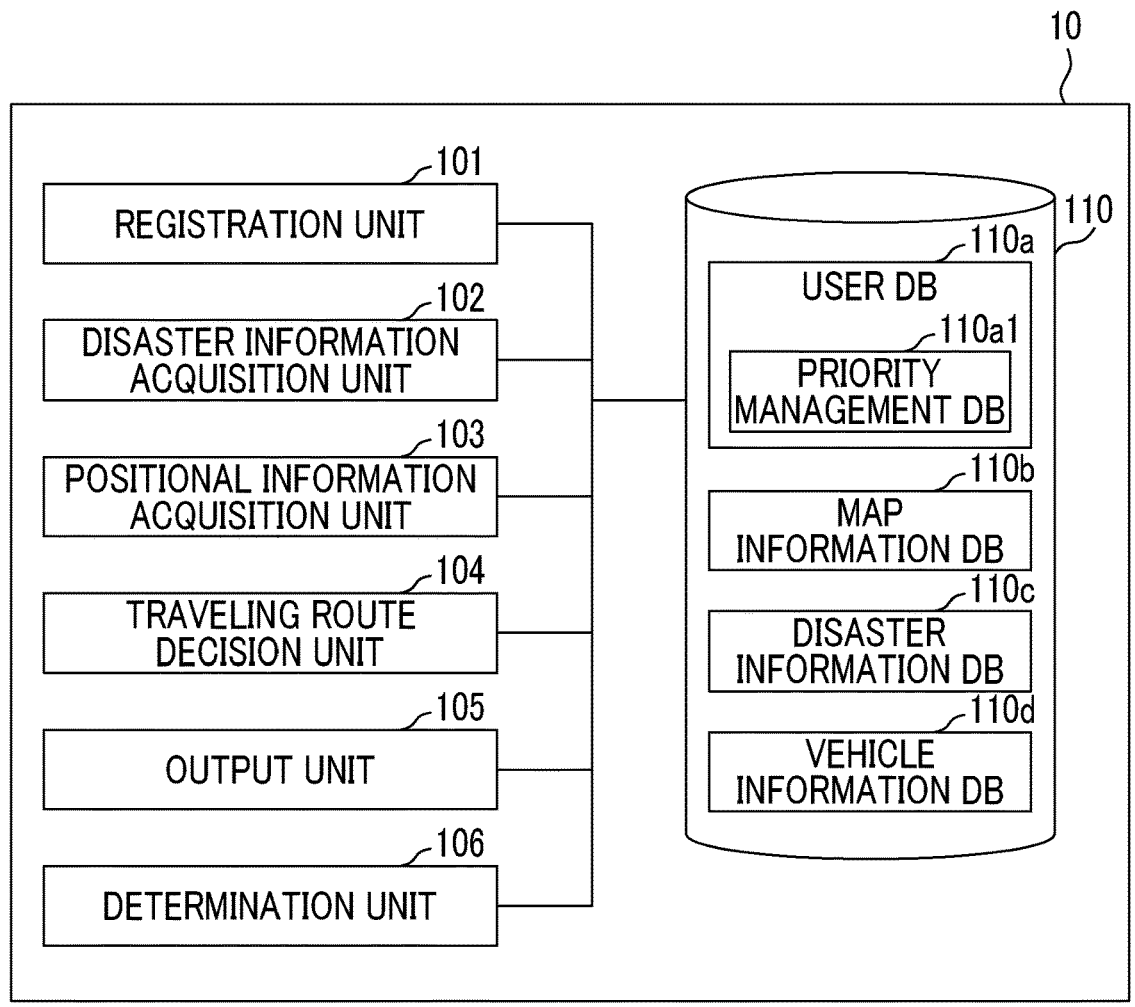
FIG. 2B is a diagram showing an example of the functional block configuration of the information processing apparatus.

FIG. 2B is a diagram showing an example of the functional block configuration of the information processing apparatus 10. The information processing apparatus 10 includes a registration unit 101, a disaster information acquisition unit 102, a positional information acquisition unit 103, a traveling route decision unit 104, an output unit 105, a determination unit 106, and a storage unit 110.

The registration unit 101, the disaster information acquisition unit 102, the positional information acquisition unit 103, the traveling route decision unit 104, the output unit 105, and the determination unit 106 can be implemented by a central processing unit (CPU) of the information processing apparatus 10 executing the program stored in the memory. The program can be stored in a recording medium. The recording medium storing the program may be a non-transitory recording medium. The non-transitory recording medium is not particularly limited, and may be, for example, a recording medium, such as a universal serial bus (USB) memory or a compact disc read only memory (CD-ROM). The storage unit 110 can be implemented using a memory or a storage device in the information processing apparatus 10.

The storage unit 110 stores a user DB 110a, a map information DB 110b, a disaster information DB 110c, and a vehicle information DB 110d.

In the user DB 110a, the personal information of the user input from the user in advance is stored. In the map information DB 110b, information relating to maps is registered. In the disaster information DB 110c, information relating to disasters provided from the master apparatus 50 is stored. In the vehicle information DB 110d, information relating to the vehicles 30 including current positions of the vehicles 30 is stored.

The registration unit 101 receives the registration of the personal information (for example, the age, address (home), family structure, and physical feature of the user, disaster risk around home, and the like) of the user from the user and stores the personal information in the user DB 110a.

In the user DB 110a, a priority management DB 110a1 (priority management unit) that identifies and manages a user (hereinafter, referred to as a "specific user"), to which priority of a person to be rescued is set when a disaster occurs, is stored.

The disaster information acquisition unit 102 acquires information regarding disaster occurrence in a predetermined area from the master apparatus 50 and stores the acquired information in the disaster information DB 110c.

The positional information acquisition unit 103 acquires current positional information of the vehicle 30 and stores the current positional information in the vehicle information DB 110d. The current positional information of the vehicle 30 may be acquired by, for example, a global positioning system (GPS) sensor mounted in the vehicle 30.

When information regarding the disaster occurrence is acquired from the disaster information acquisition unit 102, the traveling route decision unit 104 decides a traveling route from the current position of the vehicle 30 acquired by the positional information acquisition unit 103 to a position of the specific user from map information stored in the storage unit 110 in advance. The traveling route along which the vehicle 30 should travel is, for example, a traveling route from a place where the vehicle 30 is housed to the home of the specific user.

The output unit 105 outputs the traveling route decided by the traveling route decision unit 104 to the in-vehicle device 30a of the vehicle 30. The in-vehicle device 30a of the vehicle 30 controls the vehicle 30 along the output traveling route, thereby implementing autonomous driving toward the position of the specific user.

Subsequently, specific examples of the user DB 110a, the priority management DB 110a1, the disaster information DB 110c, and the vehicle information DB 110d are shown.

FIG. 3A shows a specific example of the user DB 110a. In "USER ID", an identifier for uniquely identifying the user in the system is stored. In "NAME", the input name is stored. In "SEX", the input sex is stored. In "AGE", the input age is stored. In "HOME", information (address, latitude and longitude, or the like) indicating a place of the input home is stored. In "PRESENCE OR ABSENCE OF DISORDER OR CHRONIC DISEASE", the presence or absence of a disorder or a chronic disease is stored. In "CONTENT OF DISORDER OR CHRONIC DISEASE", in a case where the input user has a disorder or a chronic disease, a specific content of the disorder or the chronic disease is stored. In "DISASTER RISK AROUND HOME", information relating to risk for disaster occurrence around the home input from the user in advance is stored. In "DISASTER RISK AROUND HOME", when the user inputs information indicating the place of the home, the information processing apparatus 10 may estimate and input risk for the disaster occurrence around the home based on the map information stored in the storage unit 110. In "VARIOUS KINDS OF INFORMATION", other kinds of information, such as a family structure of the user and whether or not the user has an injury, are stored.

FIG. 3B shows a specific example of the priority management DB 110a1 "USER ID" is the same as "USER ID" of the user DB 110a, and thus, description will not be repeated. In "PRIORITY", a specific user, to which priority of a person to be rescued is set when a disaster occurs, is identified and stored based on the input personal information (that is, information stored in the user DB 110a) of the user.

In "PRIORITY", priority of a rescue request level of a person to be rescued indicating a person who basically needs evacuation support, a person who can basically evacuate by himself or herself, or a person who can evacuate by himself or herself but needs evacuation support according to situations is set for each user based on information stored in the user DB 110a. For example, a person weak in disaster (for example, a physically handicapped person, a wounded person, an old person, a parent of an infant, or the like) who is hard to evacuate by himself or herself even though information regarding an evacuation guidance route is provided is set with high priority. In the example shown in FIG. 3B, a user ID (U05) of a person who has a physical disorder and is old is set with the highest priority (priority A). Next, a user ID (U02) of a person who is old and a user ID (U04) of a person who has a physical disorder are set with high priority (priority B), and a user ID (U01, U03) of a person who has no physical disorder and is not old is set with relatively low priority (priority E, D).

Although "PRIORITY" is set for each user as described above, "PRIORITY" is changed according to disaster risk around the home of the user or a content of a disaster that actually occurs. In the example shown in FIG. 3B, since a landslide is registered in advance as disaster risk around the home of the user having the user ID (U01), in a case where a landslide disaster warning is included in the content of the disaster acquired by the disaster information acquisition unit 102, the priority of the user ID (U01) is changed to high priority (priority A). Since flood is registered in advance as disaster risk around the home of the user having of the user ID (U02), in a case where a flood warning is included in the content of the disaster acquired by the disaster information acquisition unit 102, the priority of the user ID (U02) is changed to high priority (priority A). In the specification, the priority of the rescue request level of the person to be rescued at the time of the disaster occurrence set based on the personal information of the user is referred to as "first priority". The priority of the rescue request level of the person to be rescued changed from the first priority according to the content of the disaster is referred to as "second priority".

FIG. 4A shows a specific example of the disaster information DB 110c. In "AREA", information indicating a place where a disaster occurs is stored. In "TIME", a time when the disaster occurs is stored. In "CONTENT OF DISASTER", the type and content of the occurred disaster are stored. In "LEVEL OF DISASTER", the degree of risk (magnitude) of the occurred disaster is stored.

In the disaster information DB 110c, as described above, not only the place where a disaster actually occurs, the time when the disaster actually occurs, the content and level of the disaster, and the like are stored, but also information of a disaster to be predicted by the disaster information acquisition unit 102, which receives information of the disaster from the master apparatus 50, based on the received disaster information may be stored. That is, "AREA", "TIME", "CONTENT OF DISASTER", and "LEVEL OF DISASTER" stored in the disaster information DB 110c may be an area where a disaster is predicted, a time when the disaster is predicted, and a content and a degree of risk of the disaster.

FIG. 4B shows a specific example of the vehicle information DB 110d. In "VEHICLE ID", an identifier for uniquely identifying the housed vehicle 30 is stored. The vehicle ID may be, for example, number information of the vehicle 30. In "VEHICLE TYPE", a vehicle type of the vehicle 30 or the like is stored. In "CAPACITY", a seating capacity of the vehicle 30 is stored. In "CURRENT POSITION", information indicating a current position of the vehicle 30 (for example, information indicating a place where the vehicle 30 is stopped) is stored. In "VARIOUS KINDS OF INFORMATION", for example, the distance (in the example shown in FIG. 4B, 200 m, 500 m, 1 km, and 300 m) from the home of a user having high priority (for example, the home of a specific user set with priority A) managed in the priority management DB 110a1 is stored.

Figure 5:
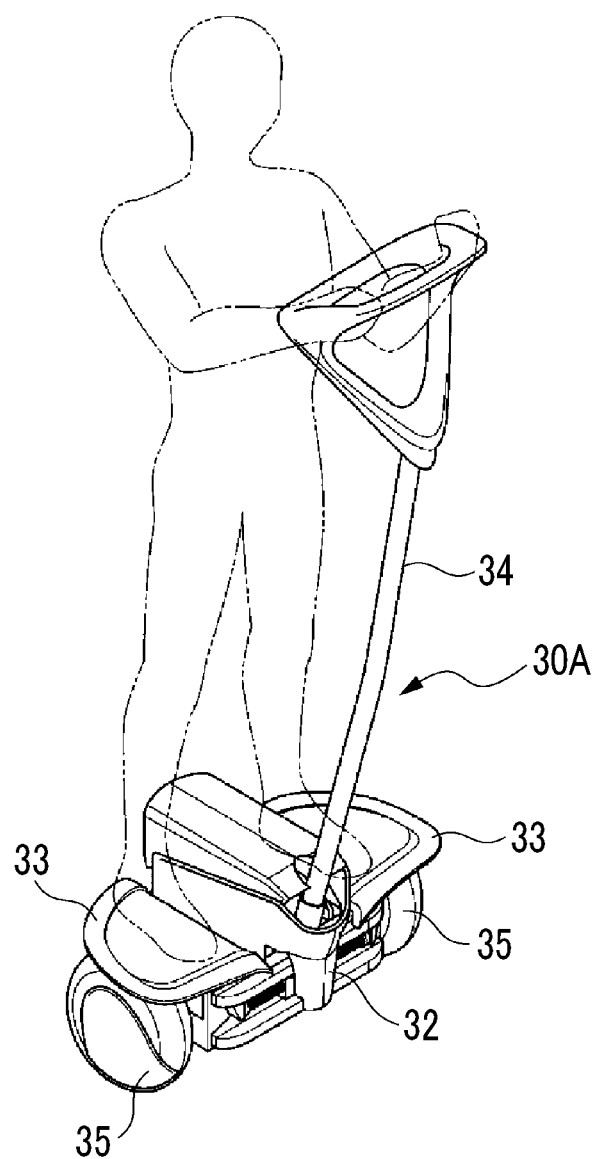
FIG. 5 is a diagram showing an example of the configuration of a vehicle.

The configuration of a vehicle that is applied to the embodiment will be described. FIG. 5 is a perspective view showing the schematic configuration of the vehicle (hereinafter, the vehicle shown in FIG. 5 is referred to as an inverted type moving object 30A).

The inverted type moving object 30A includes, for example, a vehicle main body 32, a pair of right and left step portions 33 that is attached to the vehicle main body 32 and an occupant boards, an operation handle 34 that is tiltably attached to the vehicle main body 32 and is held by the occupant, and a pair of right and left drive wheels 35 that is rotatably attached to the vehicle main body 32.

The inverted type moving object 30A is configured, for example, as a coaxial two-wheel vehicle that has the drive wheels 35 coaxially arranged and travels while maintaining an inverted state. The inverted type moving object 30A is configured to perform forward and reverse movement by moving the center of gravity of the occupant in front and rear and tilting the step portions 33 of the vehicle main body 32 in front and rear, and perform right and left turning by moving the center of gravity of the occupant right and left and tilting the step portions 33 of the vehicle main body 32 right and left. Although the coaxial two-wheel vehicle described above is applied as the inverted type moving object 30A, the disclosure is not limited thereto, and may be applied to any moving object that travels while maintaining an inverted state.

Figure 6:
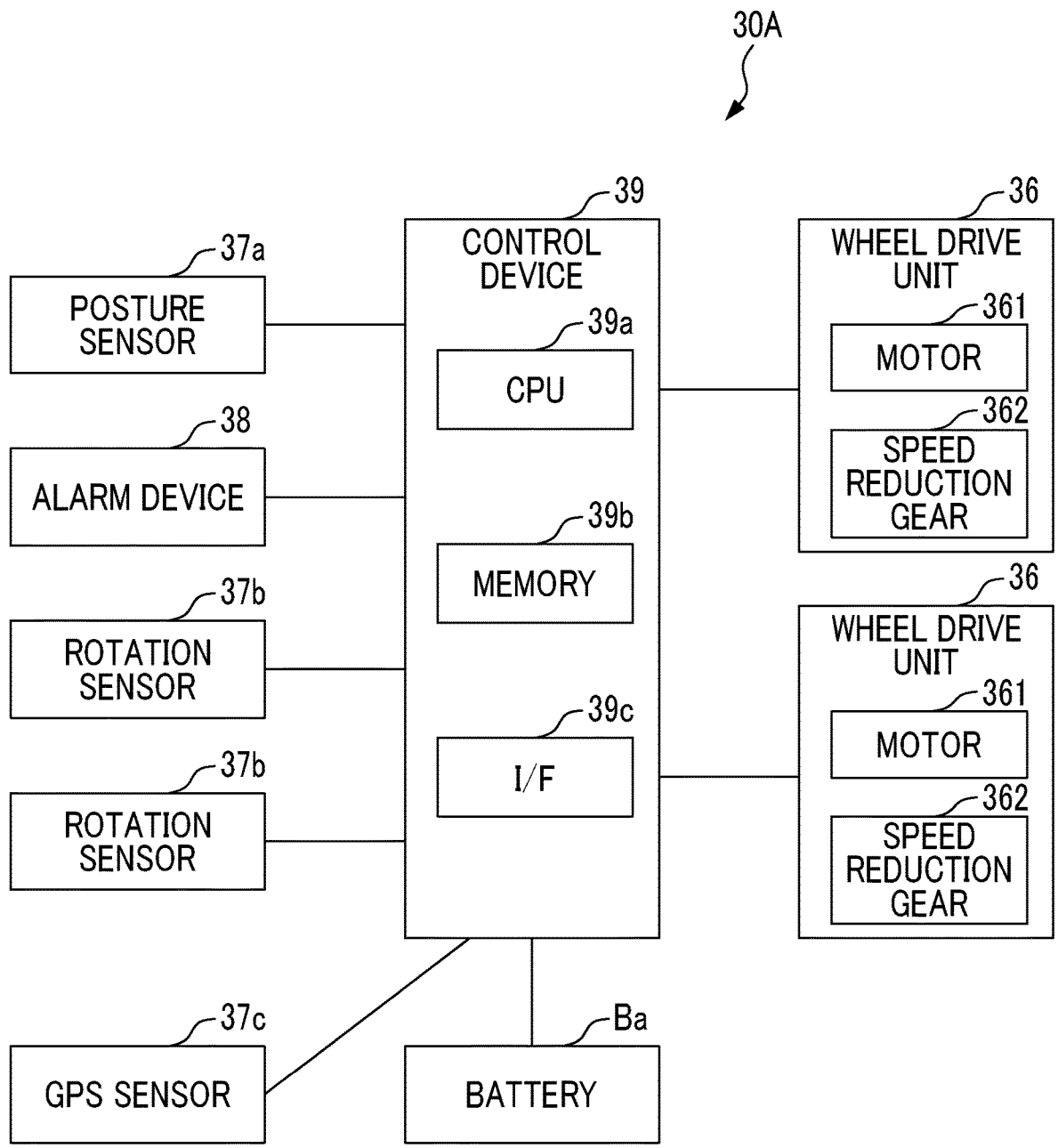
FIG. 6 is a diagram showing an example of the functional block configuration of the vehicle.

FIG. 6 is a block diagram showing a schematic system configuration of the inverted type moving object according to the embodiment. The inverted type moving object 30A according to the embodiment includes a pair of wheel drive units 36 that drives the drive wheels 35, a posture sensor 37a that detects a posture of the vehicle main body 32, a pair of rotation sensors 37b that detects rotation information of the drive wheels 35, a control device 39 that controls the wheel drive units 36, and a battery Ba that supplies electric power to the wheel drive units 36 and the control device 39.

The wheel drive units 36 are embedded in the vehicle main body 32 and drive the right and left drive wheels 35, respectively. The wheel drive units 36 can rotationally drive the drive wheels 35 independently. Each of the wheel drive units 36 can be constituted of, for example, a motor 361, and a speed reduction gear 362 coupled to a rotational shaft of the motor 361 such that power transmission is possible.

The posture sensor 37a is provided in the vehicle main body 32, and detects and outputs posture information of the vehicle main body 32, the operation handle 34, or the like. The posture sensor 37a detects posture information when the inverted type moving object 30A travels, and is constituted of, for example, a gyro sensor, an acceleration sensor, or the like. In a case where the occupant tilts the operation handle 34 forward or backward, the step portions 33 are tilted in the same direction, and the posture sensor 37a detects the posture information corresponding to such a tilt. The posture sensor 37a outputs the detected posture information to the control device 39.

Each of the rotation sensors 37b is provided in each of the drive wheels 35 and the like, and can detect rotation information, such as a rotation angle, a rotational angular velocity, and a rotational angular acceleration of each of the drive wheels 35. Each of the rotation sensors 37b is constituted of, for example, a rotary encoder, a resolver, or the like. Each of the rotation sensors 37b outputs the detected rotation information to the control device 39.

A GPS sensor 37c that acquires current positional information of the inverted type moving object 30A may be provided. The GPS sensor 37c is, for example, a part of a positional information measurement system using artificial satellites, and receives electric waves from multiple GPS satellites to measure a position (longitude, latitude, and altitude) even at any point on the earth with high accuracy. The inverted type moving object 30A may be provided with an imaging device or a communication device.

The battery Ba is embedded, for example, in the vehicle main body 32 and is constituted of a lithium-ion storage battery or the like. The battery Ba supplies electric power to the wheel drive units 36, the control device 39, other electronic apparatuses, and the like.

The control device 39 generates and outputs a control signal for driving and controlling the wheel drive units 36 based on detected values output from various sensors mounted in the inverted type moving object. The control device 39 executes predetermined computation processing, for example, based on the posture information output from the posture sensor 37a, the rotation information of the drive wheels 35 output from the rotation sensors 37b, and the like, and outputs a needed control signal to the wheel drive units 36. The control device 39 controls the wheel drive units 36 to execute inverted control for maintaining the inverted state of the inverted type moving object 30A.

An alarm device 38 is a specific example of alarm means. The alarm device 38 issues an alarm to the occupant in response to an alarm signal from the control device 39. The alarm device 38 is constituted of, for example, a speaker that output sound, a light that turns on or off a warning light, a vibration device that vibrates the vehicle main body 32, the operation handle 34, or the like, a display that performs warning display, and the like.

Figure 7:
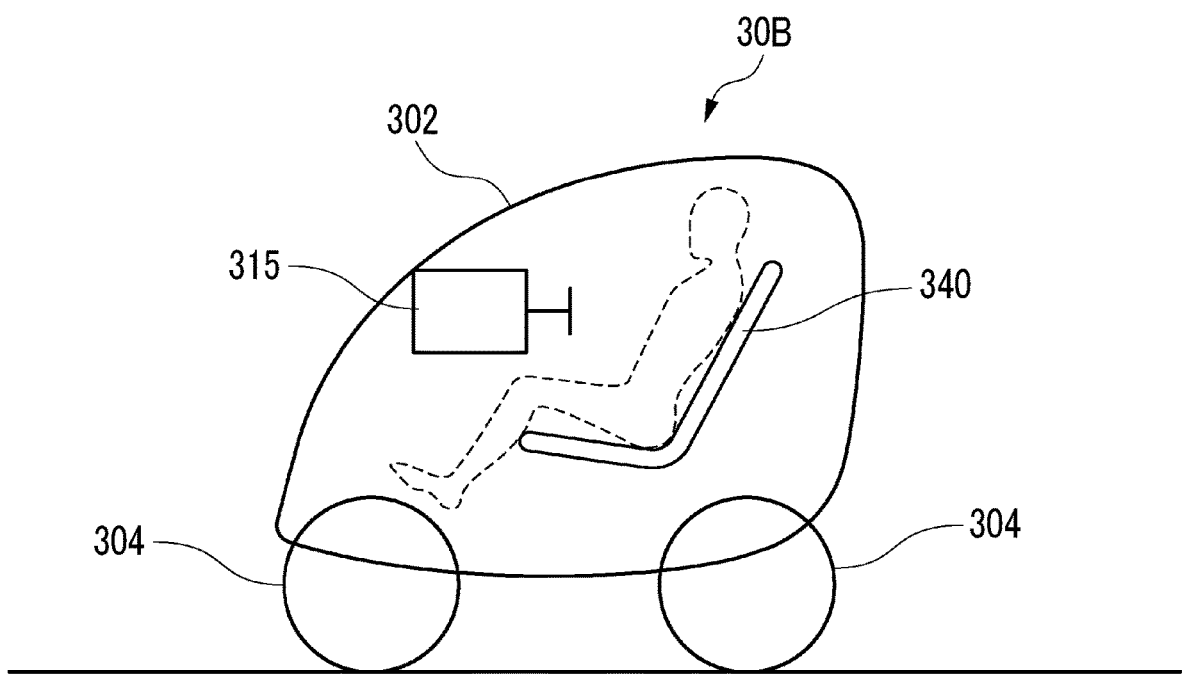
FIG. 7 is a diagram showing a modification example of the configuration of the vehicle.

A modification example of a vehicle will be described. FIG. 7 is a perspective view showing the schematic configuration of a vehicle (hereinafter, a vehicle shown in FIG. 7 is referred to as a personal moving object 30B) in the modification example.

The personal moving object 30B includes, for example, a vehicle main body 302, a seat unit 340 that is attached to vehicle main body 302 and an occupant (driver) sits, an operation unit 315 that is held by the occupant and enables the occupant to drive the personal moving object 30B, and a pair of right and left drive wheels 304 that is rotatably attached to the vehicle main body 302.

The personal moving object 30B according to the embodiment may be, for example, a compact vehicle for one or two persons, and the drive wheels 304 may include two drive wheels on the front side and one drive wheel on the rear side. Although the personal moving object 30B may be subjected to movement control according to a driver's operation, the personal moving object 30B may be switched to an autonomous traveling mode, whereby autonomous traveling may be controlled based on an image captured by an imaging device 370.

Figure 8:
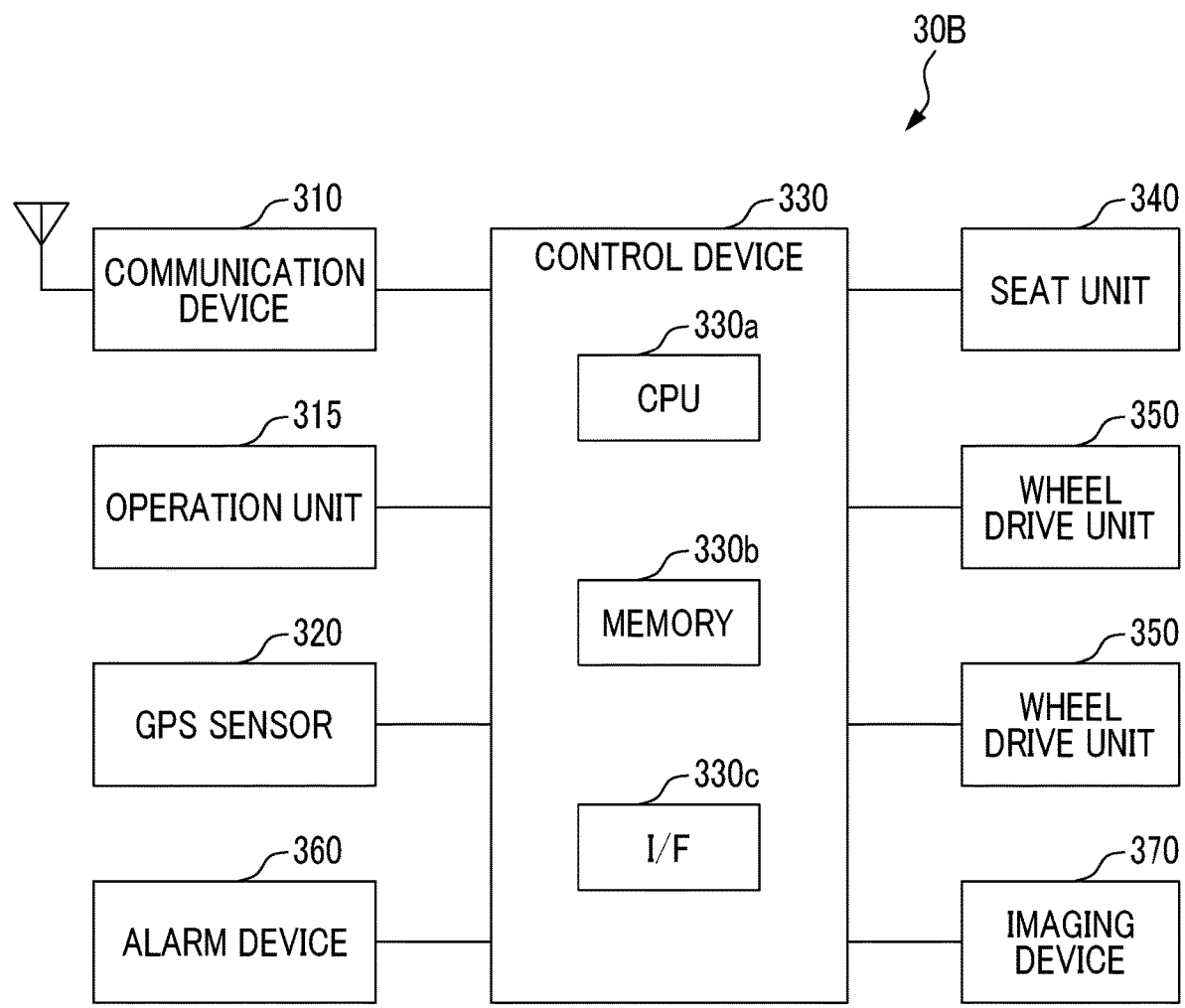
FIG. 8 is a diagram showing a modification example of the functional block configuration of the vehicle.

FIG. 8 is a block diagram showing the schematic system configuration of the personal moving object 30B. The personal moving object 30B according to the embodiment includes a pair of wheel drive units 350 that drives the drive wheels 304, the seat unit 340 on which an occupant can sit, a communication device 310 that enables communication with an external device, an operation unit 315 that enables a driving operation of the occupant, a GPS sensor 320 that acquires positional information, an alarm device 360 that can output sound, and the imaging device 370 that captures an image.

The GPS sensor 320 acquires current positional information of the personal moving object 30B. The GPS sensor 320 is, for example, a positional information measurement system using artificial satellites, and receives electric waves from multiple GPS satellites to measure a position (longitude, latitude, and altitude) even at any point on the earth with high accuracy.

A control device 330 generates and outputs a control signal for driving and controlling the wheel drive units 350 based on detected values of various sensors mounted in the personal moving object 30B or an operation content of the occupant using the operation unit 315.

The control device 330 has a CPU 330a, a memory 330b, and an I/F 330c in order to implement various kinds of processing. The CPU 330a executes at least one of functions or methods that are implemented with codes or commands included in a program stored in the memory 330b.

The memory 330b stores the program, and provides a work area for the CPU 330a. In the memory 330b, various pieces of data that are generated while the CPU 330a is executing the program are temporarily stored. The memory 330b includes, for example, a RAM, a ROM, and the like.

The I/F 330c includes an input device that is provided to input various operations on the control device 330, and an output device that is provided to output a processing result processed by the control device 330.

The seat unit 340 is a seat unit on which the occupant sits, and may have a reclinable structure.

The wheel drive units 350 are embedded in the vehicle main body 302, and drive the right and left drive wheels 304 and one drive wheel 304 on the rear side, respectively.

The alarm device 360 is a specific example of alarm means. The alarm device 360 issues an alarm to the occupant or a person outside the vehicle in response to an alarm signal from the control device 330. The alarm device 360 is constituted of, for example, a speaker that outputs sound, or the like.

The imaging device 370 is provided, for example, at such a position that an image in front of the personal moving object 30B is captured. The imaging device 370 outputs a captured image obtained by capturing an image in front of the personal moving object 30B to the control device 330.

The vehicle that is applied to the embodiment is not limited to an automobile for about one or two persons (an ultra-compact mobility) that is compact and has a small turning circle, and is smaller than a light vehicle, and also includes an automobile other than the ultra-compact mobility, such as a standard automobile.

Processing Procedure

Figure 9:
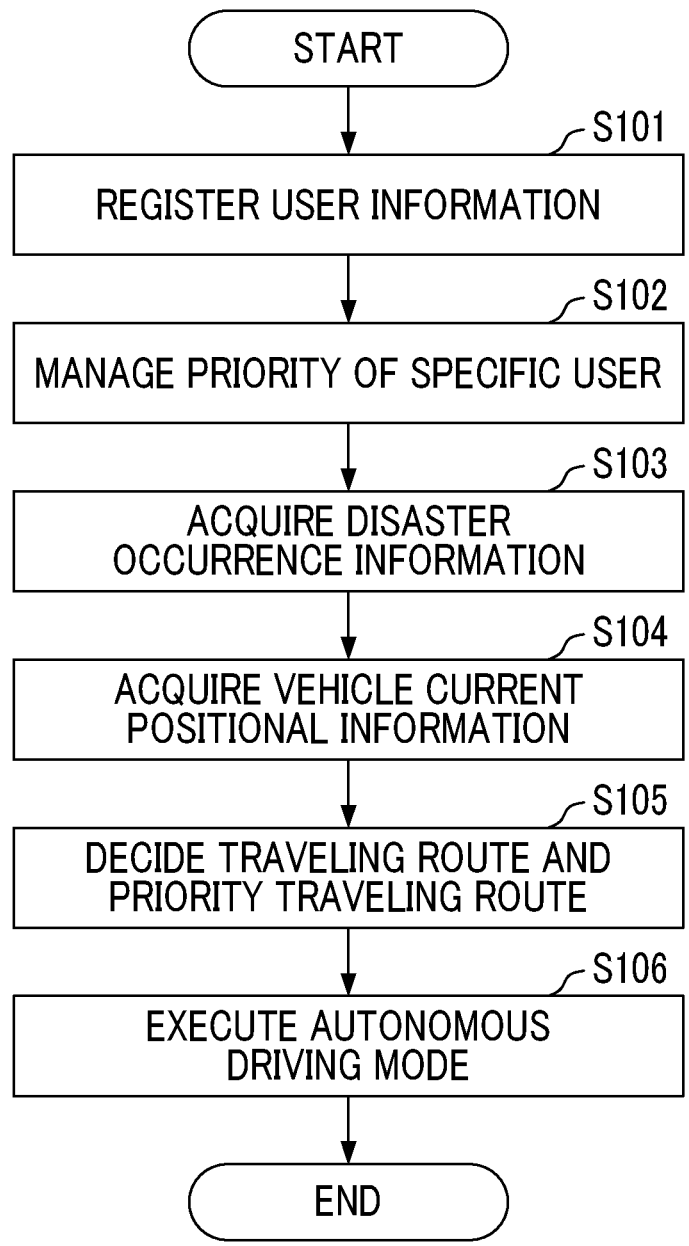
FIG. 9 is a flowchart showing an example of control processing that is executed by the information processing apparatus.

Subsequently, a processing procedure that is executed by the information processing apparatus 10 will be described. FIG. 9 is a diagram showing an example of the processing procedure that is executed by the information processing apparatus 10. It is assumed that data including a history of the information processing system 1 used by the user in the past is stored in the above-described database (storage unit 110).

In Step S101, the registration unit 101 receives the registration of the personal information including at least one of the age, address, family structure, and physical feature (the presence or absence of a disorder, the presence or absence of a chronic disease, or the like) of the user based on the contents input from the user, and stores the personal information in the user DB 110a. In addition, the registration unit 101 receives registration of information relating to disaster risk near the home of the user and stores the registered information in the user DB 110a. The processing of this step may be omitted in a case where it is assumed that data relating to the personal information of the user is stored in advance.

In Step S102, priority of a person to be rescued at the time of disaster occurrence is set for each user based on information stored in the user DB 110a, and the user set with the priority is managed as the specific user. In the specification, although the specific user can be optionally set, from a viewpoint of efficiently and promptly rescuing a person in need of rescue at the time of disaster occurrence, it is desirable to narrow down a range of the specific user from among the users to a certain degree. For example, it is desirable that the priority of a person weak in disaster (for example, a user including at least one of an old person, a disabled person, and a parent of an infant) who particularly needs evacuation guidance support at the time of the disaster occurrence is raised, and the person weak in disaster set with the raised priority is stored as the specific user. Only the person weak in disaster is stored as the specific user.

In Step S103, the disaster information acquisition unit 102 acquires information regarding occurrence of a disaster in a predetermined area from the master apparatus 50 and stores the acquired information in the disaster information DB 110c.

In Step S104, the positional information acquisition unit 103 acquires the current positional information of the vehicle 30.

In Step S105, when the disaster information acquisition unit 102 acquires information of the disaster, the traveling route decision unit 104 decides a traveling route from the current position of the vehicle 30 acquired by the positional information acquisition unit 103 to a position of the user from the map information stored in advance in the map information DB 110b.

Figure 10:
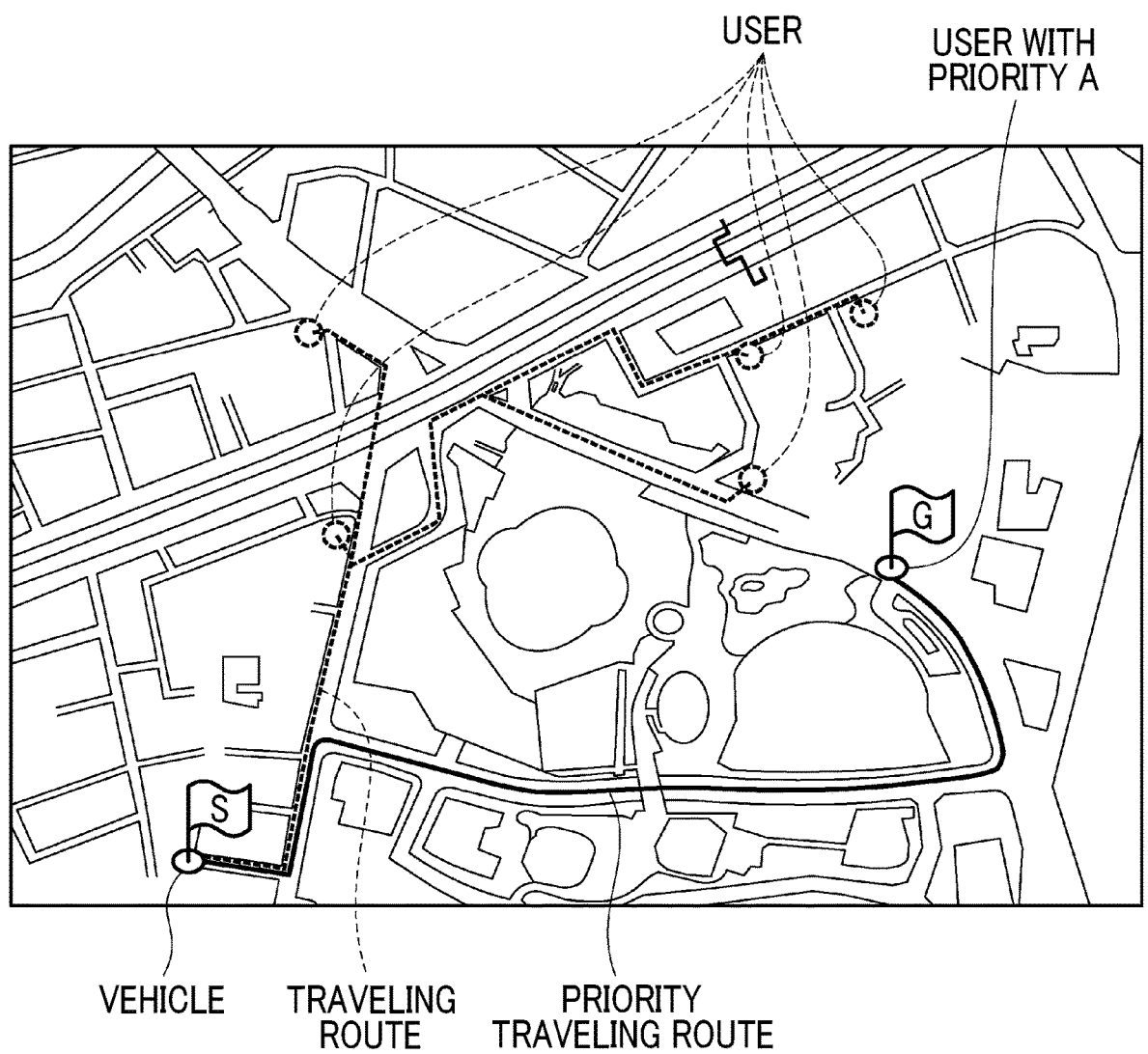
FIG. 10 is a diagram showing an example of a priority traveling route.

In an example of FIG. 10, the current positional information of the vehicle acquired by the positional information acquisition unit 103 is indicated by reference numeral S, the traveling route from the current position S of the vehicle to the position of the user is indicated by a broken line, and a priority traveling route from the current position S of the vehicle to a position of a specific user (in FIG. 10, a user G with priority A) is indicated by a solid line.

In Step S106, the output unit 105 outputs a signal for traveling in the autonomous driving mode to the position of the specific user based on information indicating the traveling route decided by the traveling route decision unit 104. The in-vehicle device 30a executes various kinds of control for allowing the vehicle 30 to be autonomously driven along the traveling route to the position of the specific user output from the information processing apparatus 10. In FIG. 10, the vehicle 30 travels in the autonomous driving mode along the priority traveling route indicated by the solid line with priority over the traveling route indicated by the broken line. The vehicle that has rushed the home of the user may provide the user with an evacuation route to be considered to enhance safety or may move the user to a safe place (for example, an evacuation place) in the autonomous driving mode, for example.

FIRST MODIFICATION EXAMPLE

Figure 11:
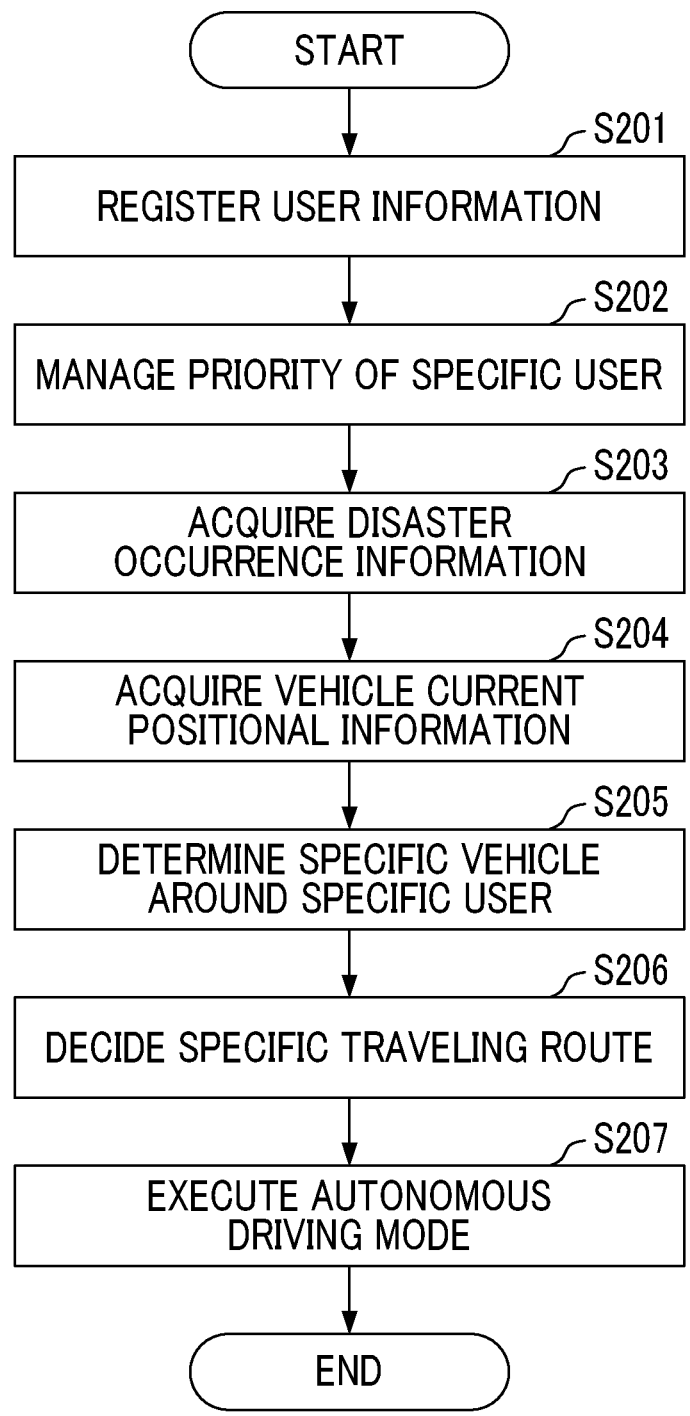
FIG. 11 is a flowchart showing a first modification example of the control processing that is executed by the information processing apparatus.

Subsequently, a first modification example of the processing procedure that is executed by the information processing apparatus 10 will be described. FIG. 11 is a diagram showing the first modification example of the processing procedure that is executed by the information processing apparatus 10.

Processing of Steps S201 to S204 is the same as the processing of Steps S101 to S104 described above, and thus, description thereof will not be repeated.

Figure 12:
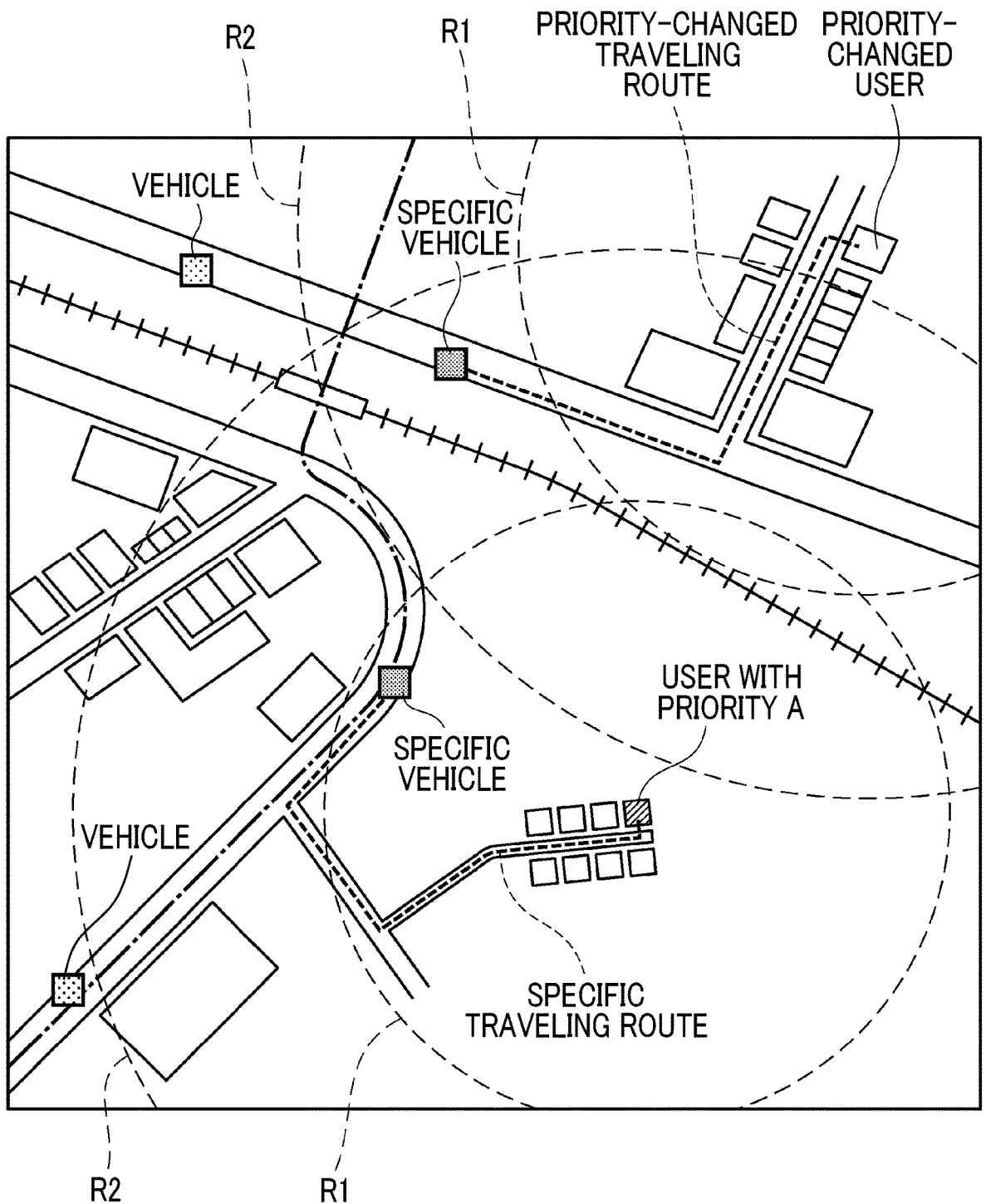
FIG. 12 is a diagram showing an example of determining a specific vehicle positioned around a specific user.

In Step S205, the determination unit 106 determines a specific vehicle that is positioned around the specific user stored in the priority management DB 110a1 from among the vehicles 30, the current position of which is acquired. In FIG. 12, an example where one specific vehicle is present at a position around a user set with priority A in the priority management DB 110a1 (in a region of a radius R1 around the user with the priority A) is shown. In a case where the determination unit 106 determines that a vehicle is not present around the user (the region of the radius R1 around the user), determination is made whether or not a vehicle is present in a region of a radius R2 greater than the radius R1, and in a case where a vehicle is present, the vehicle is determined to be a specific vehicle.

In Step S206, the traveling route decision unit 104 decides a traveling route from a current position of the specific vehicle determined by the determination unit 106 to the position of the specific user. In the specification, the traveling route is referred to as a "specific traveling route" as shown in FIG. 12.

In Step S207, the output unit 105 outputs a signal for executing the autonomous driving mode based on information indicating the specific traveling route decided by the traveling route decision unit 104. With this, as shown in FIG. 12, the specific vehicle that is positioned around the user set with the priority A travels to the position of the user in the autonomous driving mode. The vehicle that has rushed the home of the user may provide the user with an evacuation route to be considered to enhance safety or may move the user to a safe place (for example, an evacuation place) in the autonomous driving mode, for example. In this way, the specific vehicle travels to the home of the user in the autonomous driving mode, whereby it is possible to promptly perform evacuation support on or rescue the user as a person in need of rescue when a disaster occurs.

SECOND MODIFICATION EXAMPLE

Subsequently, a second modification example of the processing procedure that is executed by the information processing apparatus 10 will be described. FIG. 13 is a diagram showing a second modification example of the processing procedure that is executed by the information processing apparatus 10.

Processing of Steps S301 to S303 is the same as the processing of Steps S101 to S103 described above, and thus, description thereof will not be repeated.

In Step S304, the information processing apparatus 10 changes a set value of priority stored in the priority management DB 110a1 based on the content of the disaster acquired by the disaster information acquisition unit 102. In detail, first, in the priority management DB 110a1, different priority (first priority) is set for each user based on the personal information of the user and is identified and managed for each user. In the personal information of the user, as described above, information relating to the disaster risk around the home of the user is also included. When information corresponding to the disaster risk is included in the disaster information acquired by the disaster information acquisition unit 102, the priority of the user is changed from the first priority to the second priority higher than the first priority.

In Step S305, the current positional information of the vehicle 30 is acquired, and in Step S306, the determination unit 106 determines the vehicle 30 that is positioned within a predetermined range of the user (priority-changed user) with the changed set value of priority. In FIG. 12, an example where, while a vehicle is not present around the priority-changed user (in the region of the radius R1 around the user), a vehicle (specific vehicle) is present in the region of the radius R2 around the user is shown. The processing of Steps S305 and S306 may be omitted. That is, in a case where a vehicle is not present around the priority-changed user from the current positional information of the vehicle 30 registered in advance, the processing of Steps S305 and S306 may be omitted, and in this case, the vehicle is moved, for example, from a station where the vehicle is housed in advance to the home of the priority-changed user in the autonomous driving mode.

In Step S307, a priority-changed traveling route from a position where the specific vehicle determined by the determination unit 106 is present to the position of the user (priority-changed user) with the changed set value of priority is decided.

In Step S308, the output unit 105 outputs the signal for executing the autonomous driving mode based on information indicating the priority-changed traveling route decided by the traveling route decision unit 104. With this, as shown in FIG. 12, the specific vehicle (the vehicle determined to be present in the region of the radius R2 around the user with changed priority) that is positioned around the user with changed priority travels to the position of the user in the autonomous driving mode. In this way, the priority of the user is changed from the first priority set in advance to the second priority higher than the first priority according to the content of the disaster, and the traveling route is changed to a traveling route toward the home of the user with the second priority, whereby it is possible to efficiently and promptly rescue or perform evacuation support on a user corresponding to a person in need of rescue in the disaster.

The above-described embodiment is for facilitating the understanding of the disclosure and is not to be interpreted to limit the disclosure.

For example, in the above-described embodiment, although the configuration of the vehicle mounted with the information processing apparatus has been described, a part (for example, the disaster information acquisition unit, the traveling route decision unit, and the like) of the processing of the information processing apparatus may be provided in the vehicle and the other kinds of processing (for example, the registration unit, the priority management unit, and the like) of the information processing apparatus may not be provided in the vehicle, or vice versa. The flowchart described in the embodiment, a sequence, elements in the embodiment, and arrangement, material, condition, shape, size, and the like of each of the elements are not limited to those described above and can be appropriately modified. In addition, components described in different embodiments can be partially substituted with each other or can be combined with each other.

What is claimed is:

1. An information processing apparatus comprising:
   a registration unit configured to receive registration of personal information including at least one of an age, an address, a family structure, and a physical feature of a user;
   a priority management unit configured to, based on the registered personal information, store a specific user set with priority for a person to be rescued at the time of disaster occurrence;
   a disaster information acquisition unit configured to acquire information regarding occurrence of a disaster in a predetermined area;
   a positional information acquisition unit configured to acquire information regarding a current position of an autonomous driving vehicle;
   a traveling route decision unit configured to, when the disaster information acquisition unit acquires the information regarding occurrence of the disaster, decide a traveling route from the current position of the autonomous driving vehicle to a position of the specific user; and
   an output unit configured to output a signal for executing an autonomous driving mode based on information indicating the traveling route decided by the traveling route decision unit.

2. The information processing apparatus according to claim 1, wherein:
   the registration unit is configured to further receive registration of information relating to disaster risk around the address of the user; and
   when the information regarding occurrence of the disaster acquired by the disaster information acquisition unit is information corresponding to the disaster risk, the output unit is configured to output the signal for executing the autonomous driving mode to the user positioned around the address.

3. The information processing apparatus according to claim 1, wherein:

the priority management unit is configured to raise priority for a person weak in disaster who needs evacuation guidance support at the time of the disaster occurrence, and stores, as the specific user, the person weak in disaster set with the raised priority;

when the disaster information acquisition unit acquires the information regarding occurrence of the disaster, the traveling route decision unit is configured to further decide a priority traveling route from the current position of the autonomous driving vehicle to a position of the person weak in disaster in the traveling route; and the output unit is configured to output the signal for executing the autonomous driving mode based on information indicating the priority traveling route.

4. The information processing apparatus according to claim 1, further comprising a determination unit configured to determine a specific vehicle positioned around the specific user among autonomous driving vehicles, the information regarding the current position of which is acquired by the positional information acquisition unit, wherein:

the traveling route decision unit is configured to further decide a specific traveling route from a current position of the specific vehicle to the position of the specific user; and the output unit is configured to output the signal for executing the autonomous driving mode based on information indicating the specific traveling route.

5. The information processing apparatus according to claim 1, wherein:

the priority management unit is configured to store first priority as the priority set for each user based on the personal information and second priority as a priority changed to be higher than the first priority for a user who is located in a risk section to be predicted according to a content of the disaster acquired by the disaster information acquisition unit;

the traveling route decision unit is configured to further decide priority-changed traveling route from the current position of the autonomous driving vehicle to a position of the user set with the second priority; and the output unit is configured to output the signal for executing the autonomous driving mode based on information indicating the priority-changed traveling route.

6. A vehicle mounted with the information processing apparatus according to claim 1.

7. A storage medium storing a program causing a computer to execute registering personal information including at least one of an age, an address, a family structure, and a physical feature of a user, based on the registered personal information, storing a specific user set with priority for a person to be rescued at the time of disaster occurrence, acquiring information regarding occurrence of a disaster in a predetermined area, acquiring information regarding current position of an autonomous driving vehicle, when the information regarding occurrence of the disaster is acquired, deciding a traveling route from the current position of the autonomous driving vehicle to a position of the specific user, and outputting a signal for executing an autonomous driving mode based on information indicating the traveling route.

* * * * *